United States Patent [19]

Hobara

[11] Patent Number: 4,825,017

[45] Date of Patent: Apr. 25, 1989

[54] COORDINATES INPUT DEVICE

[75] Inventor: Hidetoshi Hobara, Miyagi, Japan

[73] Assignee: Alps Electric Co., Ltd., Japan

[21] Appl. No.: 101,010

[22] Filed: Sep. 24, 1987

[30] Foreign Application Priority Data

Dec. 1, 1986 [JP] Japan ................................ 61-183682

[51] Int. Cl.4 ............................................. G08C 21/00
[52] U.S. Cl. ........................................ 178/18; 178/20
[58] Field of Search ............................... 178/18, 19, 20

[56] References Cited

U.S. PATENT DOCUMENTS 3,735,023  5/1973  Hurst et al. ............................ 178/18

Primary Examiner—Stafford D. Schreyer
Attorney, Agent, or Firm—Guy W. Shoup; Paul J. Winters; Stephen L. Malaska

[57] ABSTRACT

Disclosed is a coordinate input device which, in a device including first collecting electrodes disposed at both edges of a first resistive film and parallel to each other and second collecting electrodes disposed at both edges of a second resistive film and parallel to each other, the first and second resistive films being disposed opposite to each other with the first and second collecting electrodes meeting at right angles to each other, and further including plural auxiliary electrodes disposed on the first and second resistive film and parallel to the respective first and second collecting electrodes, is adapted such that an unusable region is provided between the first or second collecting electrode and the respective auxiliary electrode disposed adjacent thereto.

2 Claims, 3 Drawing Sheets

COORDINATES INPUT DEVICE

BACKGROUND OF THE INVENTION

1. Field of the Invention

The present invention relates to a coordinates input device for detecting coordinates of input positions of handwritten characters and graphic forms.

2. Description of the Prior Art

In computer terminals and terminals for handwritten character and graphic communications, there are used coordinates input device, called data tablets or digitizers, for detecting coordinates of handwritten characters and graphic forms.

In such coordinates input devices, there are ones of digital system which detect input positional coordinates by means of diodes in digitized or quantized form and ones of analog system which detect input positional coordinates as X and Y coordinates of positions on the resistive film, in an analog manner, by means of two resistive sheets overlaid with a resistive film.

Since the former ones of the digital system have complexity in their circuit configuration and also a disadvantage in the aspect of its cost for manufacture, the latter ones of analog system have primarily been in use recently.

There have so far been proposed two types in the analog coordinates input devices. Namely, those of an electrostatic coupling type in which input surfaces of two resistive sheets are pressed toward each other by an electrical pen driven by an A.C. power source and those of a contact type in which two resistive sheets are pressed together by an indicating pen to have the input positional coordinates detected as changes in voltage or current.

Construction and operation of a coordinates input device of the contact type proposed so far will be described through the use of FIGS. 3 and 4.

Here, FIG. 3 is a partially cutaway plan view showing construction of the coordinates input device proposed so far and FIG. 4 is a sectional view taken along the line A—A of FIG. 3.

A first resistive sheet 3 is provided by having a first insulating substrate 1 of a polyester film or the like in a virtually square form overlaid with a thin first resistive film 2 of indium oxide or the like by evaporation. On the first resistive sheet 3, there are formed first collecting electrodes 4 at both edges of the first resistive film 2 extending in parallel with each other. And, on the first resistive film 2, there are disposed a plurality of auxiliary electrodes 5 extending in parallel with the two first collecting electrodes 4.

Similarly, a second resistive sheet 8 is provided by having a second insulating substrate 6 overlaid with a second resistive film 7, and second collecting electrodes 9 are formed on the second resistive sheet 8 at both edges of the second resistive film 7 in parallel with each other. And, a plurality of auxiliary electrodes 10 are disposed on the second resistive film 7 in parallel with the second collecting electrodes 9.

The thus formed first and second resistive sheets 3 and 8 are disposed opposite to each other with the first and second collecting electrodes 4 and 9 meeting at right angles to each other and their circumferential portion is fixed by a frame-formed insulating spacer 11.

On the side of the first resistive sheet 3, one end of one of the first collecting electrodes 4 is connected through a switch 12 with the positive electrode of a battery 13, the negative electrode of the battery 13 being grounded. And, at the one end of the one of the first collecting electrodes 4, there is provided an extracting terminal $t_2$. Further, one end of the other first collecting electrode 4 is grounded through a switch 14.

Likewise, on the side of the second resistive sheet 8, one end of one of the second collecting electrode 9 is connected through the switch 12 with the positive electrode of the battery 13, the negative electrode of the battery 13 being grounded. And, at the one end of the one of the second collecting electrodes 9, there is provided an extracting terminal $t_3$. Further, one end of the other second collecting electrode 9 is grounded through the switch 14.

The switches 12 and 14 are adapted to be computer-controlled, for example, such that a constant D.C. voltage E is alternately applied to the first and second collecting electrodes 4 and 9 on the first and second resistive sheets 3 and 8.

If, now, the D.C. voltage E is applied to the first resistive sheet 3 with the switch 12 turned to the side of the terminal $t_5$ and the switch 14 turned to the side of the terminal $t_6$, whereas the second resistive sheet 8 is held in an open state, and a point p is pushed by an indicating pen from the surface of the second resistive sheet 8 to cause the first and second resistive films 2 and 7 of the first and second resistive sheets 3 and 8 to come in contact at the point p, then there is established a potential gradient in the direction x on the first resistive film 2 of the first resistive sheet 3 and a divided voltage $e_x$ is produced at the point p on the first resistive film 2, which voltage $e_x$ is detected by means of the extracting terminal $t_3$ from the second collecting electrode 9 on the second resistive sheet 8. Here, representing the coordinates of the point p by (x, y) and the distance between both the first collecting electrodes 4 for the first resistive sheet 3 by L, the following equation holds under the condition that the resistance value of the first resistive film 2 per unit area is uniform $$e_x/E = x/L \qquad (1)$$

Therefore, the x coordinate of the point p can be obtained by obtaining $e_x$. And, after detecting the x coordinate, if the switches 12 and 14 are operated so that the D.C. voltage is connected to the second resistive sheet 8 while the first resistive sheet 3 is brought to an open state, then, by the same detection principle as above, the y coordinate of the point p can be obtained by detecting a voltage $e_y$ on the first collecting electrode 4 for the first resistive sheet 3 through the extracting terminal $t_2$.

The auxiliary electrodes 5 and 10 disposed on the first and second resistive films 2 and 7 have the function to establish equipotential positions on their respective resistive films thereby to correct distortion of the equipotential lines on the resistive films.

In order that the input coordinates will be correctly detected, the thickness of the first and second resistive films 2 and 7 must be uniform throughout the entire areas, and thereby, the resistance value per unit area must be maintained constant at any position on each resistive film. But, as a matter of fact, it is difficult to form the first and second resistive films 2 and 7 in uniform thickness and therefore it is unavoidable that some nonuniformity of the film thickness is produced. Further, it sometimes occurs that a flaw is made in the resistive films 2 and 7 in the course of manufacture or use, whereby a discontinuous portion is locally produced. Accordingly, there is the possibility of the equation (1) not holding good, for example, when the thickness of the first resistive film 2 of the first resistive sheet 3 is uneven and also there is a portion of discontinuity somewhere therein, because the equipotential lines on the first resistive film 2 are then brought nonparallel to the first collecting electrodes 4, and as a result, the measured voltage values may become different for positions on the same x coordinate but different y coordinates on the first resistive film 2.

In such cases, however, if the auxiliary electrodes 5 and 10 are disposed as described above on the first and second resistive films 2 and 7, in the measurement, for example, on the first resistive film 2 as described above, the auxiliary electrodes 5 establish the equipotential positions on the first resistive film 2 by force. Therefore, even if some distortions in the equipotential lines are present within a range of the first resistive film 2 between the auxiliary electrodes 5 produced by variations in the resistance value per unit area due to existence of uneven thickness or flaws, because equipotential positions are established on both sides of the region by force by the auxiliary electrodes 5 sandwiching the region therebetween, such distortions in the equipotential lines are compressed into these equipotential positions. Also on the second resistive film 7 the distortions in the equipotential lines are corrected by the auxiliary electrodes 10.

In the described manner, distortions in the equipotential lines on the resistive film due to existence of uneven thickness or flaws can be compressed so as not to affect adjacent regions and linearity of the equipotential lines as a whole can be largely improved.

According to the hitherto proposed coordinates input device as described above, distortions in the equipotential lines due to existence of uneven film thickness or flaws can be remedied by the provision of the auxiliary electrodes and thereby highly accurate measurement of the input positional coordinates can be performed.

However, a potential gradient established by the collecting electrode itself is not correctable in the coordinates input device so far proposed. Therfore, even if the thickness of the resistive films is uniform and there is no flaw therein, some distortion is produced in the equipotential lines between the collecting electrode and the auxiliary electrode. adjacent thereto.

That is, since the collecting electrode formed by Ag print has such a form that its length 1 is very large as compared with its sectional area s as shown in FIG. 5, it becomes necessary also to take the resistance of the collecting electrode itself into consideration. This factor becomes stronger as the coordinates input device becomes larger and the collecting electrode becomes longer.

Referring to FIG. 5, when the potential at one end of the first collecting electrode 4 connected with the battery 13 is denoted by $e_1$, The potential at the other end of the first collecting electrode 4 by $e_4$, resistivity of Ag by $\rho$, and voltage of the battery 13 by E, then $$e_1 = E \quad (2)$$

$$e_4 = E - i_0 \cdot \rho \cdot 1/S \quad (3),$$

where $i_0$ in equation (3) denotes the current flowing through the first collecting electrode 4.

From (2), (3), it is apparent that $e_1 > e_4$, and if the potentials $e_2$, $e_3$ along the length of the first collecting electrode 4 are obtained, $e_1 > e_2 > e_3 > e_4$ likewise holds. Accordingly, currents $i_1$ to $i_4$ of different current densities ($i_1 > i_2 > i_3 > i_4$) flow from the points whose potentials are $e_1$ to $e_4$ on the first collecting electrode 4 into the first resistive film 2.

Therefore, distribution of equipotential lines in the region 2D between the first collecting electrode 4 and the auxiliary electrode 5 adjacent thereto becomes as indicated by dotted lines in FIG. 5, and thus, the equipotential lines in the region 24 are largely distorted even if the thickness of the resistive film is uniform and there is no flaw in the resistive film.

SUMMARY OF THE INVENTION

The present invention has been made in view of the above described situation of the coordinates input device hitherto proposed and a primary object of the invention is the provision of a coordinates input device which will be able to make highly accurate measurement unaffected by the distortion in the equipotential lines due to the electrical gradients resulting from the collecting electrodes.

In order to achieve the above mentioned object, the device according to the present invention, in a coordinates input device including first collecting electrodes disposed at both edges of a first resistive film in parallel with each other and second collecting electrodes disposed at both edges of a second resistive film in parallel with each other, the first and second resistive films being disposed opposite to each other with the first and second collecting electrodes meeting at right angles to each other, and further including plural auxiliary electrodes disposed on the first and second resistive films in parallel with the respective first and second collecting electrodes, is constructed such that an unusable region is provided between the first and second collecting electrodes and the auxiliary electrodes disposed adjacent thereto.

The device according to the present invention is structured so as to be provided with an unusable region disposed between the first and second collecting electrodes and the auxiliary electrodes adjacent thereto on the first and second resistive films, respectively, so that measurement is disabled in the region where the measurement will be affected by the electrical gradients produced by the collecting electrodes. Thus, the device is enabled to make highly accurate measurement of input positional coordinates unaffected by the distortion in the equipotential lines due to the electrical gradients resulting from the collecting electrodes at all times, with the auxiliary electrodes adjacent to the collecting electrodes taken as reference electrodes.

BRIEF DESCRIPTION OF THE DRAWINGS

FIGS. 1 and 2 are for describing an embodiment of the present invention, wherein FIG. 1 is a partially cutaway plan view showing construction of the important portion of a coordinate input device and FIG. 2 is a sectional view taken along the line B—B of FIG. 1;

DESCRIPTION OF THE PREFERRED EMBODIMENT

An embodiment of the present invention will be described below in detail with reference to FIGS. 1 and 2.

Figure 1:
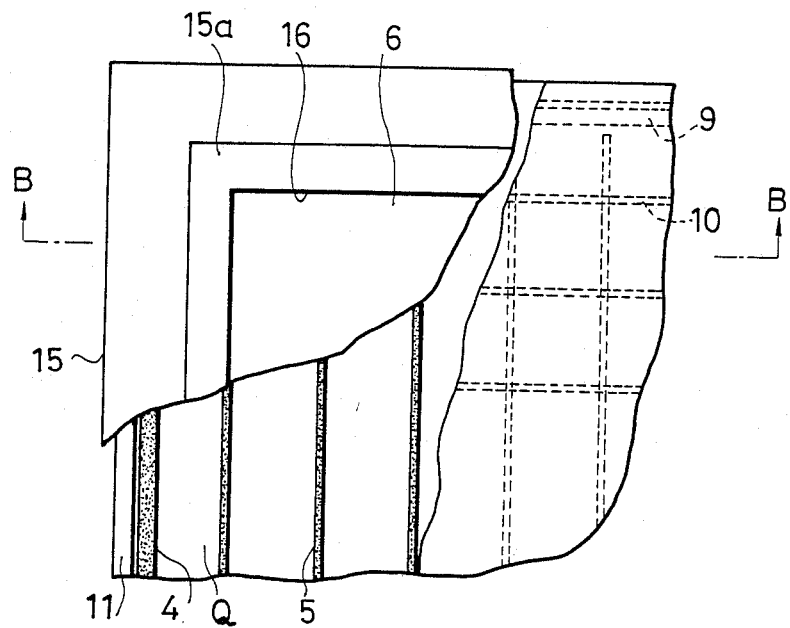
Figure 2:
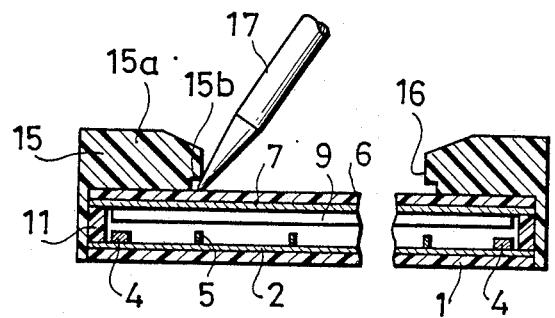

FIG. 1 is a partially cutaway plan view showing construction of the important portion of an embodiment of the present invention and FIG. 2 is a sectional view taken along the line B—B of FIG. 1.

Figure 3:
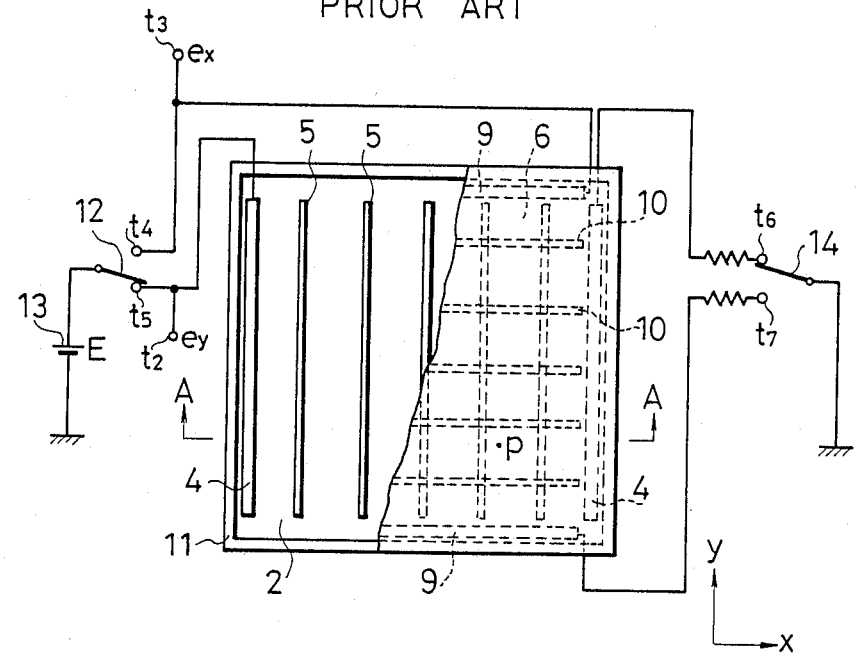
FIG. 3 is a partially cutaway plan view showing construction of a coordinate input device hitherto proposed.
Figure 4:
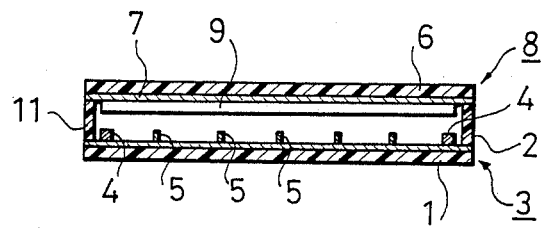
FIG. 4 is a sectional view taken along the line A—A of FIG. 3.
Figure 5:
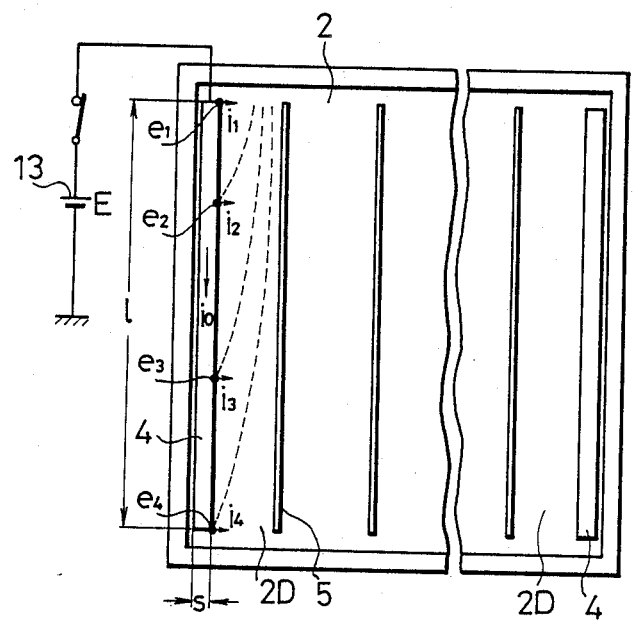
FIG. 5 is an explanatory drawing showing the effect of electrical gradients produced by a collecting electrode in a coordinates input device.

The embodiment of the present invention is such that the hitherto proposed coordinates input device described above through the use of FIGS. 3 and 4 is provided in abutment on its entire peripheral surface with a frame body 15 made of an insulating material such as synthetic resin. The frame body 15 has a square opening 16 formed by a projection 15a being integral therewith and projecting over the surface of the second insulating substrate 6 from the circumferential portion, with the projected end surface of the projection 15a disposed coincident with the auxiliary electrodes 5 adjacent to the first collecting electrodes 4 and the auxiliary electrodes 10 adjacent to the second collecting electrodes 9.

At the end portion of the projection 15a of the frame body 15 toward the second insulating substrate 6, there is formed a recess 15b, which recess 15b is made in such a form that the tip of the indicating pen 17 for pushing the points of the positional coordinates on the surface of the second insulating substrate 6 is enabled to correctly push the positions in the vicinity of the auxiliary electrodes 5 and 10 adjacent to the collecting electrodes 4 and 9 as shown in FIG. 2.

Thus, in the embodiment described above, there is provided an unusable region Q above the resistive films 2 and 7 at the circumferential portion between the collecting electrodes 4 and 9 and the auxiliary electrodes 5 and 10 disposed adjacent to the collecting electrodes 4 and 9, such that the unusable region Q is overhung by the projection 15a of the frame body 15.

Since the other structure of the embodiment than that described above is the same as that of the hitherto proposed coordinates input device described above through the use of FIGS. 3 and 4, description thereof is omitted to avoid duplication.

Operation of the above embodiment will now be described.

In the present invention, the portion of the second insulating substrate 6 other than the unusable region Q, i.e., the portion enclosed by the auxiliary electrodes 5 disposed on the resistive film 2 adjacent to the collecting electrodes 4 and by the auxiliary electrodes 10 disposed on the resistive film 7 adjacent to the collecting electrodes 9 is located within the opening 16 of the frame body 15. Therefore, by pushing the second insulating substrate 6 located within the opening 16 with the indicating pen 17, i.e., by pushing the usable region enclosed by the auxiliary electrodes 5 and 10 adjacent, respectively, to the first and second collecting electrodes 4 and 9, the input of coordinates is achieved.

The region outside the usable region enclosed by the above mentioned auxiliary electrodes 5 and 10 is overhung by the projection 15a, and therefore, the input of coordinates is not executed therein. Thus, highly accurate measurement for inputting coordinates can be achieved unaffected by the electrical gradients produced by the first and second collecting electrodes 4 and 9 and taking as reference the auxiliary electrodes adjacent to those collecting electrodes.

As to the input in the vicinity of the auxiliary electrodes 5 and 10 adjacent to the first and second collecting electrodes 4 and 9, since the peripheral surface of the indicating pen 17 can enter into the recess 15b, the input can be performed by the tip of the indicating pen 17 with high precision.

According to the present invention as described in detail so far, it has been made possible to provide a coordinates input device enabled to measure the input positional coordinates with high precision unaffected by the electrical gradients produced by the first and second collecting electrodes.

What is claimed is:

1. In a coordinates input device including first collecting electrodes disposed at both edges of a first resistive film and parallel to each other, second collecting electrodes disposed at both edges of a second resistive film and parallel to each other, said first and second resistive films being disposed opposite to each other with said first and second collecting electrodes meeting at right angles to each other, and plural auxiliary electrodes disposed on said first and second resistive films and parallel to said respective first and second collecting electrodes, said coordinates input device comprising:

an unusable region disposed between said first or second collecting electrode and the respective auxiliary electrode disposed adjacent thereto.

2. A coordinates input device according to claim 1, wherein said unusable region is overhung by a projection of a frame body provided at the circumferential portion of said coordinates input device.

* * * * *